J. E. KAPTEINA.
TONGS FOR HANDLING GLASS POTS.
APPLICATION FILED MAR. 31, 1913.

1,120,819.

Patented Dec. 15, 1914.

WITNESSES
W. T. Holman
Elbert L. Hyde

INVENTOR
John E. Kapteina
By Fredk W. Winter
his attorney.

UNITED STATES PATENT OFFICE.

JOHN E. KAPTEINA, OF SPRINGDALE, PENNSYLVANIA.

TONGS FOR HANDLING GLASS-POTS.

1,120,819.

Specification of Letters Patent. Patented Dec. 15, 1914.

Application filed March 31, 1913. Serial No. 757,898.

*To all whom it may concern:*

Be it known that I, JOHN E. KAPTEINA, a resident of Springdale, in the county of Allegheny and State of Pennsylvania, have invented a new and useful Improvement in Tongs for Handling Glass-Pots, of which the following is a specification.

This invention relates to tongs for handling and transporting glass pots, such as are used for making plateglass.

The object of the invention is to provide a pair of tongs which will firmly secure and hold the pot, and by means of which it may be lifted and transported from place to place, and filled with and emptied of molten glass, without liability of the pot escaping from the tongs; and also whereby the pot may be dipped into and filled or partly filled from a mass of molten glass without submerging the tongs therein or permitting the glass to contact therewith.

The invention comprises the construction and arrangement of parts hereinafter described and claimed.

Figure 6:
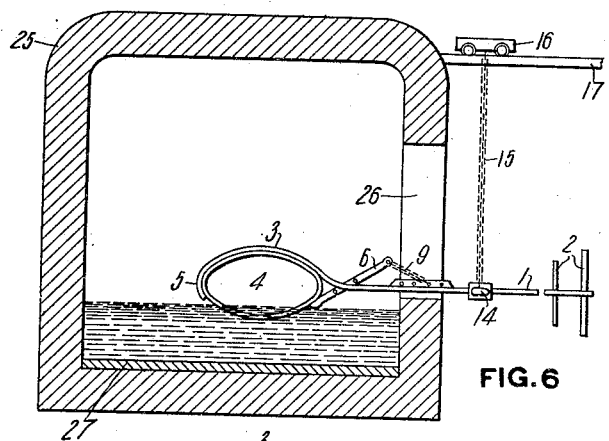
Figure 5:
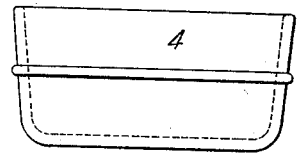
Figure 1:
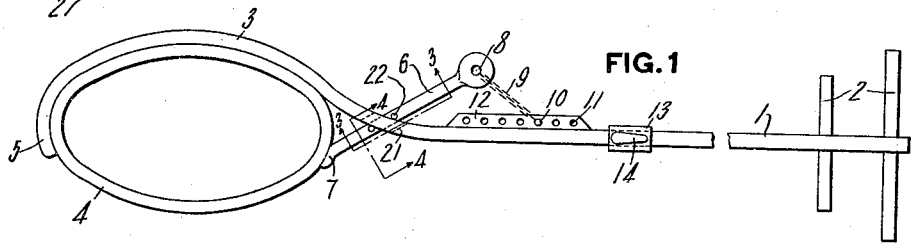
Figure 2:
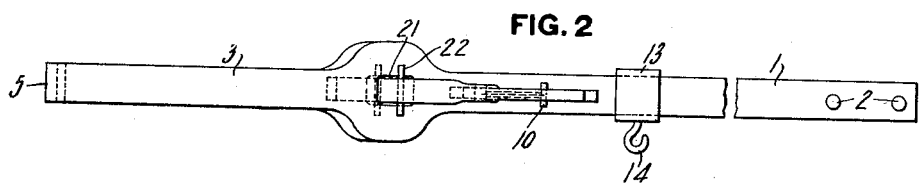
Figure 3:
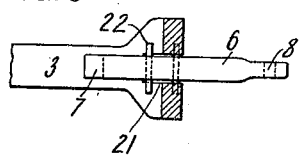
Figure 4:
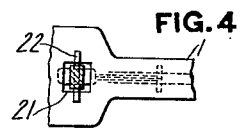
Figure 7:
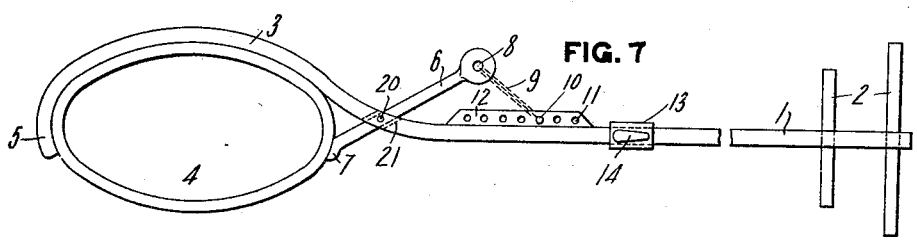

In the drawings Figure 1 represents a plan view of a pair of tongs embodying the invention, and illustrating a glass pot held therein; Fig. 2 is an edge view thereof; Fig. 3 is a detail section taken on the line 3—3, Fig. 1; Fig. 4 is a similar view taken on the line 4—4, Fig. 1; Fig. 5 is a side elevation of the melting pot; Fig. 6 is a sectional elevation of a glass furnace, showing the manner in which the tongs are used; and Fig. 7 is a detail view illustrating a modification.

In my companion application, filed of even date herewith, Serial No. 757,899, I have described, illustrated and claimed a method of handling glass, which method consists in melting down the glass in a large tank, reservoir or furnace, and removing it therefrom in batches by means of a pot supported by a pair of tongs, and with which the pot is thrust into the furnace and the molten glass dipped up thereinto. The pot with the molten glass contained therein, and supported in said tongs, is then transported to a second or tempering furnace and later removed therefrom and the glass poured. The present invention has particular relation to the tongs described and used in connection with said method.

As illustrated in the drawings, the tongs comprise a long, heavy bar or rod 1, which may gradually taper toward one end, where it is provided with one or more cross bars or other suitable handles 2, by means of which the tongs and the pot supported therein may be manipulated. At its other end, the bar or rod 1 is offset and curved to one side to form a jaw 3, which fits and embraces substantially one-half of the curved outer surface of the melting pot 4 beneath a horizontal bead or rib thereon shown in Fig. 5. The location of this bead or rib determines the amount of glass which may be scooped up with the pot without submerging any portion of the tongs, which amount increases as the bead is placed nearer the upper edge of the pot. The extreme end 5 of jaw 3 extends slightly beyond a line through the axis of the bar or rod 1.

Pivotally connected to the bar or rod 1, and preferably at or near the point where the jaw 3 is offset therefrom, is an arm or lever 6, having an inner end portion 7 which forms a jaw to coöperate with jaw 3 and is arranged to contact with the melting pot 4 on the same side of the axis of the bar 1, as the end portion 5 of jaw 3. At its outer end arm or lever 6 is provided with an eye or loop 8 having secured thereto one end of a short chain or flexible securing member 9, having a pin 10 on its other end adapted to be secured in one of a number of apertures 11 in a side plate 12 secured to bar 1 to lock the tongs in closed position. Any other suitable locking means may of course be used.

Intermediate its ends the bar or rod 1 is provided with a collar or sleeve 13, rigidly secured thereto, and provided with a hook or eye 14, by means of which the tongs and the pot carried thereby may be supported from a rope or cable 15 secured to a car or carrier 16 traveling along an overhead track 17.

The arm or lever 6 may be pivotally connected to the bar or rod 1 in any desired manner, such as by means of the pivot pin 20, as in Fig. 7. Preferably, however, the bar 1 is slotted or split at or near the point where the jaw 3 is offset therefrom, as at 21, and the arm or lever 6 projects through said slot and is provided on the opposite sides of the bar 1 with pins or projections 22 to prevent it from escaping therefrom. In the form just described, the pivot is floating, as there is no positive pintle or pin about which the arm or lever 6 rotates.

In use of the tongs, the securing pin 10 is released from the aperture 11 to open jaw 7 of the tongs. The tongs are then placed in position around the pot 4 while the latter is lying in a heating furnace, and are secured rigidly in fixed position thereupon, by inserting the pin 10 into one of the apertures 11. The end 5 of jaw 3 and the jaw 7 are both on the same side of the axis of bar 1, and consequently the tongs embrace the melting pot for slightly more than half its circumference, thereby preventing it from escaping from the tongs. When the pot has been grasped and secured in the manner described, the pot is withdrawn from the furnace and the car 16 is run along the track 17 to bring the device in front of the melting furnace 25, which is provided with a door 26 and a hearth 27 which holds the mass of molten glass. The pot carried by the tongs is thrust into the melting furnace and a batch of glass dipped up therewith. This is accomplished by slowly submerging the free edge of the pot beneath the surface of the molten glass. This is accomplished by a gentle scooping motion in the manner shown in Fig. 6, without allowing the tongs to dip into the molten glass, thereby preventing the glass from being contaminated. When the pot has been filled or partly filled, it is withdrawn by the tongs from the furnace and is transported along the track 17 to another or tempering furnace, or to the casting table, as described in my co-pending application above referred to.

The tongs described are comparatively simple and are so arranged as to firmly and securely hold the pot without permitting the same to escape therefrom. They also permit a large and heavy pot to be manipulated by only one or two men, as the bar 1 can be made as long as desired to secure more or less leverage.

What I claim is:—

1. A pair of tongs for holding and supporting glass pots, comprising a bar or rod provided with an operating handle at one end, the other end of said bar or rod being offset and curved to form a jaw adapted to embrace substantially one-half the circumference of the pot, said bar intermediate its ends being slotted, and a second bar projecting through said slot and provided with projections on the opposite sides of said first named bar or rod, one end of said second named bar forming a short jaw to coöperate with said curved jaw, the other end of said second named bar being provided with an eye, and a flexible member for connecting said eye to the first named bar or rod for clamping said jaws around the pot.

2. A pair of tongs for holding and supporting glass pots, comprising a bar or rod provided with a transverse handle at one end, the other end of said bar or rod being offset and curved to form a jaw adapted to embrace substantially one-half the circumference of the pot, said bar intermediate its ends being slotted, and a second bar projecting through said slot and provided with projections on the opposite sides of said first named bar or rod, one end of said second named bar forming a jaw to coöperate with said curved jaw, the other end of said second named bar being provided with an eye, a flexible member for connecting said eye to the first named bar or rod for clamping said jaws around the pot, and means rigidly secured to said bar intermediate its ends whereby said tongs may be suspended.

In testimony whereof, I have hereunto set my hand.

JOHN E. KAPTEINA.

Witnesses:
ELBERT L. HYDE,
WILLIAM B. WHARTON.

Copies of this patent may be obtained for five cents each, by addressing the "Commissioner of Patents, Washington, D. C."